(12) United States Patent
Nguyen

(10) Patent No.: US 6,808,464 B1
(45) Date of Patent: Oct. 26, 2004

(54) REINFORCED-LAYER METAL COMPOSITE BAT

(76) Inventor: Thu Van Nguyen, 24128 Hillhurst Dr., West Hills, CA (US) 91307

(*) Notice: Subject to any disclaimer, the term of this patent is extended or adjusted under 35 U.S.C. 154(b) by 309 days.

(21) Appl. No.: 09/721,297

(22) Filed: Nov. 22, 2000

Related U.S. Application Data

(60) Provisional application No. 60/168,915, filed on Dec. 3, 1999.

(51) Int. Cl.$^7$ ............................................. A63B 59/06
(52) U.S. Cl. ....................................... 473/566; 473/567
(58) Field of Search ................................. 473/566, 567

(56) References Cited

U.S. PATENT DOCUMENTS

| | | | |
|---|---|---|---|
| 3,861,682 A | * | 1/1975 | Fujii ........................... 473/566 |
| 4,092,025 A | | 5/1978 | Yanagioka |
| 5,104,123 A | | 4/1992 | Okitsu et al. |
| 5,114,144 A | * | 5/1992 | Baum ........................ 428/35.6 |
| 5,364,095 A | | 11/1994 | Easton et al. |
| 5,395,108 A | | 3/1995 | Souders et al. |
| 5,415,398 A | | 5/1995 | Eggiman |
| 5,421,572 A | | 6/1995 | Mackay, Jr. |
| 5,511,777 A | * | 4/1996 | McNeely ..................... 473/520 |
| 5,593,158 A | | 1/1997 | Filice et al. |
| 5,722,908 A | | 3/1998 | Feeney et al. |
| 5,772,541 A | | 6/1998 | Buiatti |
| 5,899,823 A | | 5/1999 | Eggiman |
| 5,906,550 A | | 5/1999 | Kingston |
| 6,042,493 A | * | 3/2000 | Chauvin et al. ............ 473/566 |
| 6,053,827 A | * | 4/2000 | MacKay et al. ............ 473/566 |
| 6,251,034 B1 | | 6/2001 | Eggiman |
| 6,398,675 B1 | | 6/2002 | Eggiman et al. |
| 2001/0012807 A1 | | 8/2001 | Eggiman |
| 2001/0046910 A1 | | 11/2001 | Sutherland |

* cited by examiner

*Primary Examiner*—Mark S. Graham
(74) *Attorney, Agent, or Firm*—Kelly, Lowry & Kelley, LLP

(57) ABSTRACT

A reinforced-layer metal composite bat includes a metal outer shell forming a handle, a barrel, and an intermediate tapered section interconnecting the barrel and handle. A composite fiber shell is fixed to an outer surface of a metal inner shell. First and second opposing open ends of the composite fiber and inner shells are covered with elastomeric caps. The composite fiber and metal inner shell are positioned within the barrel of the outer shell to form an enlarged effective hitting area in the barrel that produces a desired audible sound upon impact.

26 Claims, 3 Drawing Sheets

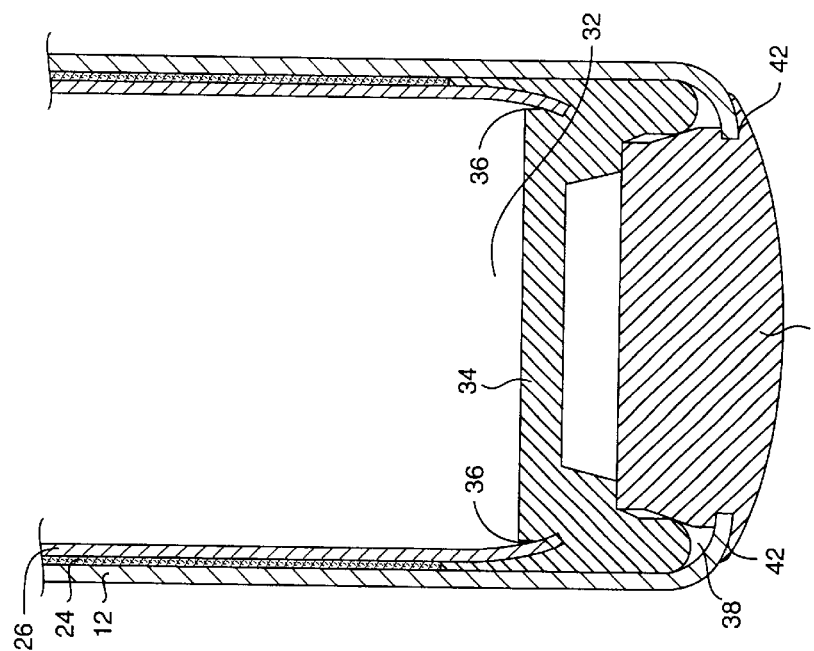
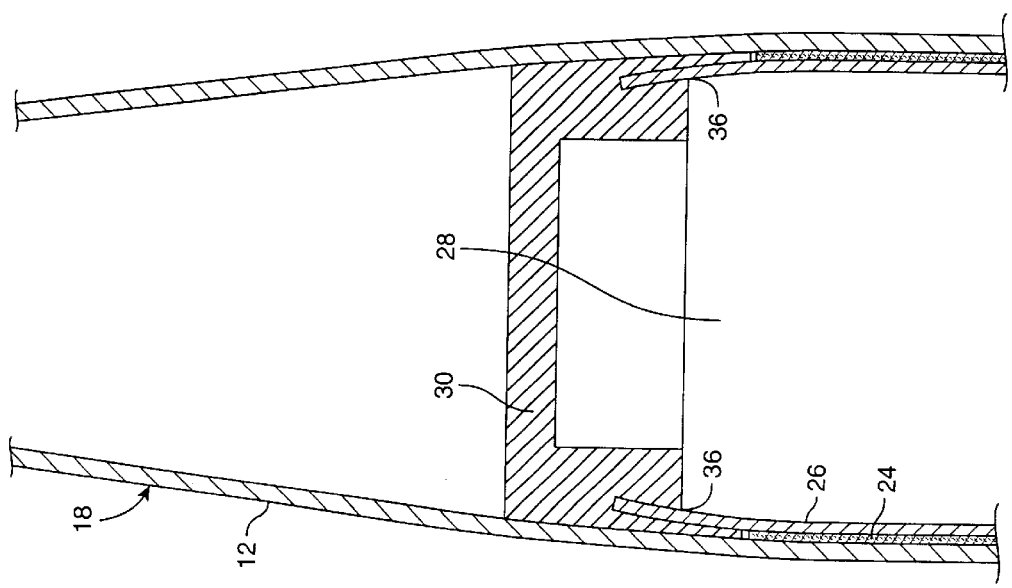

REINFORCED-LAYER METAL COMPOSITE BAT

RELATED APPLICATION

This application claims priority from provisional application Ser. No. 60/168,915 filed Dec. 3, 1999.

BACKGROUND OF THE INVENTION

The present invention relates to baseball and softball bats. More particularly, the present invention relates to a metal bat having a layered, reinforced barrel.

Baseball and softball are very popular sports in the United States, Mexico, Cuba, Japan and elsewhere. Due to the competitive nature of the sports, the players are constantly seeking ways of improving their performance. An important aspect of baseball and softball is the ability to effectively hit the ball. Aluminum (metal) bats are allowed in baseball amateur play from Little League to College levels. Metal bats are also typically used in slow and fast pitch softball. Such bats are advantageous over wood bats in that they do not break and splinter like wood bats and thus can be repeatedly used with consequent cost savings. Metal bats also have a larger optimal hitting area or power zone (commonly referred to as the "sweet spot") than wood bats. Furthermore, the ball comes off a metal bat faster than a wood bat resulting in longer hits.

However, metal bats have certain disadvantages. As opposed to the traditional sound heard when a wood bat contacts the ball, metal bats emit an undesirable high-pitched metallic sound. Metal bats also vibrate upon impact and may send painful vibrations into the hands and arms of the batter if the ball is not hit within the power zone of the bat. Metal bats, particularly aluminum bats, may also dent or otherwise deform due to forceful impacts with the ball.

Various attempts have been made to overcome the problems associated with metal bats. Some attempts have been to coat or wrap the exterior of the metal bat with materials such as carbon reinforcing fibers to enhance batting performance. These externally wrapped bats have been found to be aesthetically unpleasant and lacking in significant improvement. Other attempts have been made to insert internal layers or compartments within the metal bat to improve performance. Such designs include utilizing multiple-layered graphite inserts to provide durability and flexibility to the bat, tubular coiled spring steel inserts to improve the spring-board effect when the ball contacts the bat, and pressurized air chambers within the bat. While providing benefits, these designs also have drawbacks. Some designs are very expensive to manufacture and are prone to structural failure. The composite sheaths break down over time and the bats are subject to premature longitudinal cracks in the barrel of the bat. In many of the newly designed metal bats, the reinforcement is focused around the optimal hitting area or center of the hitting area of the bat and do not run the length of the barrel of the bat.

Accordingly, there is a need for a reinforced metal bat which enhances the performance of the bat and overcomes the disadvantages previously experienced with metal bats. The present invention fulfills these needs and provides other related advantages.

SUMMARY OF THE INVENTION

The present invention resides in a reinforced-layer metal composite bat which has a larger hitting zone, produces a "wood" audible sound upon impact, and which reduces vibration when the bat contacts a ball. The bat generally comprises a metal outer shell having a handle, a barrel, and an intermediate tapered section interconnecting the barrel and handle. A composite fiber shell is positioned within the barrel of the outer shell plus a section of 1.50 to 2.5 inches of the tapered section. A metal inner shell is positioned within the composite fiber shell and fixed to the composite fiber shell to form an effective hitting area in the barrel that produces a desirable "wood" audible sound upon impact.

The outer and inner metal shells are typically comprised of an aluminum alloy. The barrel of the outer shell preferably has a thickness exceeding the thickness of the inner shell. First and second opposing open ends of the inner and composite shells are covered with elastomeric caps to dampen vibrations and enhance the desired audible sound upon impact. Preferably, the inner and composite shells are of substantially the same length and extend substantially the length of the barrel of the outer shell. A high impact-resistant resin layer may be interposed between the composite shell and the barrel of the outer shell, or the composite shell can be adhered to the barrel of the outer shell by means of an adhesive.

The method for manufacturing the bat comprises first providing a metal outer shell having a handle, a barrel and an intermediate tapered section interconnecting the barrel and handle. A middle inner shell is also provided. A composite fiber shell is fixed to an exterior surface of the inner shell by laminating composite fibers over the exterior surface of the inner shell. Open ends of the composite fiber and inner shells are closed with elastomeric caps. The composite fiber shell and inner shell are placed within the barrel of the outer shell. A resin may be placed between the inner surface of the barrel and the composite fiber shell, or the outer surface of the composite fiber shell is adhered to the inner surface of the barrel.

The resulting reinforced-layer metal composite bat has a relatively large hitting zone, or "sweat spot" due to the combination of the composite layers. Use of the resin enhances a trampoline effect when the bat strikes a ball. The elastomeric caps dampen vibrations that tend to sting the hitter's hands when the bat contacts a ball. Moreover, the overall combination of the composite material sandwiched between two layers of metal shell, as well as the elastomeric caps, produce a "wood-sound" effect instead of a typical high-pitched metallic sound common with traditional metal bats.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged cross-sectional view of area "3" of FIG. 1;

FIG. 4 is an enlarged cross-sectional view of area "4" of FIG. 1; and

DETAILED DESCRIPTION OF THE PREFERRED EMBODIMENT

Figures 1, 2:
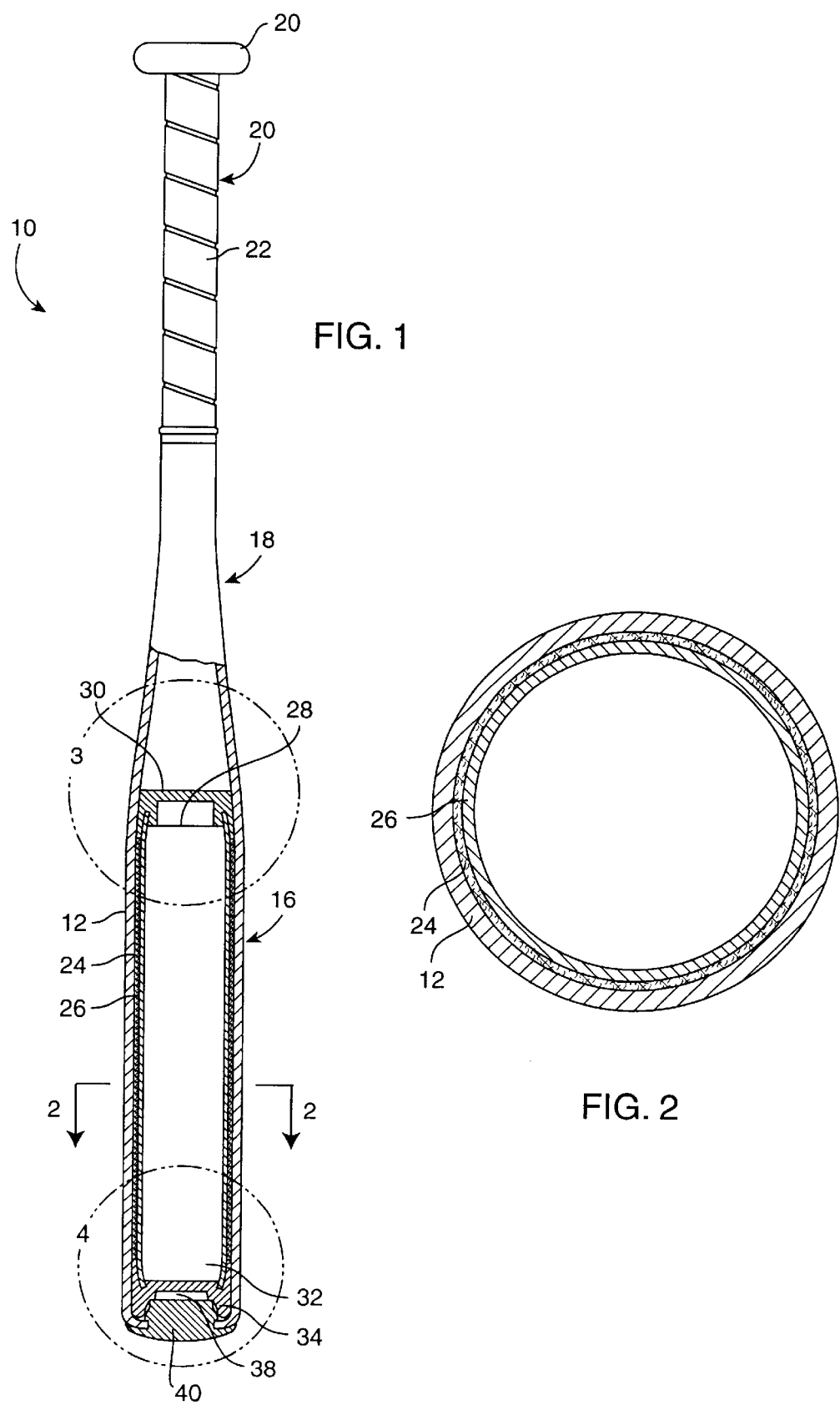
FIG. 1 is a partially sectioned elevational view of a bat embodying the present invention.
FIG. 2 is a cross-section of the bat taken generally along line 2—2 of FIG. 1.

As shown in the drawings for purposes of illustration, the present invention is concerned with a reinforced-layer metal bat 10 for use in baseball or softball, having an outer shell 12 comprised of a lightweight yet durable metal such as aluminum, titanium, magnesium, or an alloy thereof. Preferably, the outer shell is comprised of a 7000 series aluminum alloy in which zinc is the major alloying element coupled with a smaller percentage of magnesium, resulting in a heat-treatable alloy of very high strength. As will be described further herein, the outer shell 12 is finished to a mechanical strength of T6 Temper. The outer shell 12 is comprised of a handle 14, a barrel 16 and an intermediate tapered section 18 interconnecting the handle 14 and barrel 16. A knob 20 may be welded or otherwise securely attached to the end of the handle 14. Also, the handle 14 is typically wrapped with a grip 22 comprised of rubber, polyurethane, leather or the like, for comfort.

As can be seen from FIGS. 1 and 2, the barrel 16 of the outer shell 12 is reinforced with a composite fiber shell 24 fixed to an outer surface of an inner metal shell 26. The inner shell 26 is comprised of aluminum, titanium, magnesium, or alloys thereof. Like the outer shell 12, the inner shell 26 is preferably comprised of a 7000 series aluminum alloy treated to attain a T6 Temper. The composite shell 24 comprises a composite material, such as fiber-reinforced or laminar composite or the like, fixed to an outer surface of the inner shell 26. Preferably, the inner shell 26 is contour formed to fit the inner contour of the outer shell 12 and provide just enough space for the intermediate composite fiber shell 24 to fit between the inner and outer shells 26 and 12. Although the inner shell 26 and attached composite fiber shell 24 can be of varying lengths, the inner end composite fiber shells are preferably of the length substantially matching that of the barrel 16 of the outer shell 12 so as to extend along nearly the entire length of the barrel 16.

As illustrated in FIG. 2, the barrel 16 of the outer shell 12 has a thickness which exceeds that of the inner shell 26. The thickness of the composite shell 24 depend on the inside diameter of the outer shell 12 and the outside diameter of the inner shell 26. The diameters and thicknesses of the outer shell 12, composite shell 24, and inner shell 26 can be varied to alter the characteristics and performance of the bat 10.

As illustrated in FIGS. 1 and 3, a first open end 28 of the attached composite fiber and inner shells 24 and 26 is closed off with a cap 30. The cap is preferably comprised of an elastomeric material, such as rubber or ethylene propylene terpolymer, which can be press-fit into the barrel 16 of the bat 10, and serves to dampen vibrations resulting when the bat 10 strikes a ball. As illustrated in FIG. 4, a second open end 32 of the attached composite fiber and inner shells 24 and 26 is likewise closed off with an elastomeric cap 34. Although the composite shell 24 and inner shell 26 are of substantially the same length, and can be of exactly the same length, in the illustrated preferred embodiment the inner shell 26 extends beyond the composite shell 24 at the first and second ends thereof 28 and 32 and are directed inwardly so as to fit within groves 36 formed in the caps 30 and 34. This enables the caps 30 and 34 to be retained more securely and provide enhanced vibration dampening.

As illustrated in FIGS. 1 and 4, an end 38 of the barrel 16 is typically open and directed inward for acceptance and retention of an end plug 40. The end plug 40 is typically comprised of urethane, polyurethane, Zytel or the like. The end plug 40 has a circumferential groove 42 which accepts the inwardly directed end of the barrel 38. The end plug 40 can also be configured to frictionally fit with cap 34 to further secure each in place.

The inner shell 26 can be contoured to form fit the inner contour of the outer shell 12 and provide just enough space for the intermediate composite layer 24 to fit between the outer and inner shells 12 and 24. The composite shell 24 can be adhered to the inner surface of the barrel 16 with an appropriate adhesive or the like. A resin layer can be interposed between the composite shell 24 and the barrel 16 of the outer shell 12. Such a resin layer (not shown) has been found to increase what is known as a desirable "trampoline effect" when the barrel 16 strikes a ball.

A method of manufacturing the bat 10 of the present invention will now be described. It is to be understood that the following method may be altered in some respects while still creating a bat 10 having the desired characteristics. Also, certain dimensions, materials, temperatures, etc. may be altered depending upon the size, weight and intended use of the resulting bat 10. Accordingly, a softball bat having a length of 34 inches and weighting 28 ounces will be described by way of example in connection with the manufacturing method.

Metal tubes, such as aluminum alloy tubes, are provided at predetermined lengths and weights prior to manufacturing. For purposes of the following example, an aluminum alloy tube having a length of 19.9 inches and a weight of 18.5 ounces is provided for the outer shell 12. An aluminum alloy tube having a length of 14.9 inches and weight of 13.9 ounces is provided for the inner shell 26.

Figure 5:
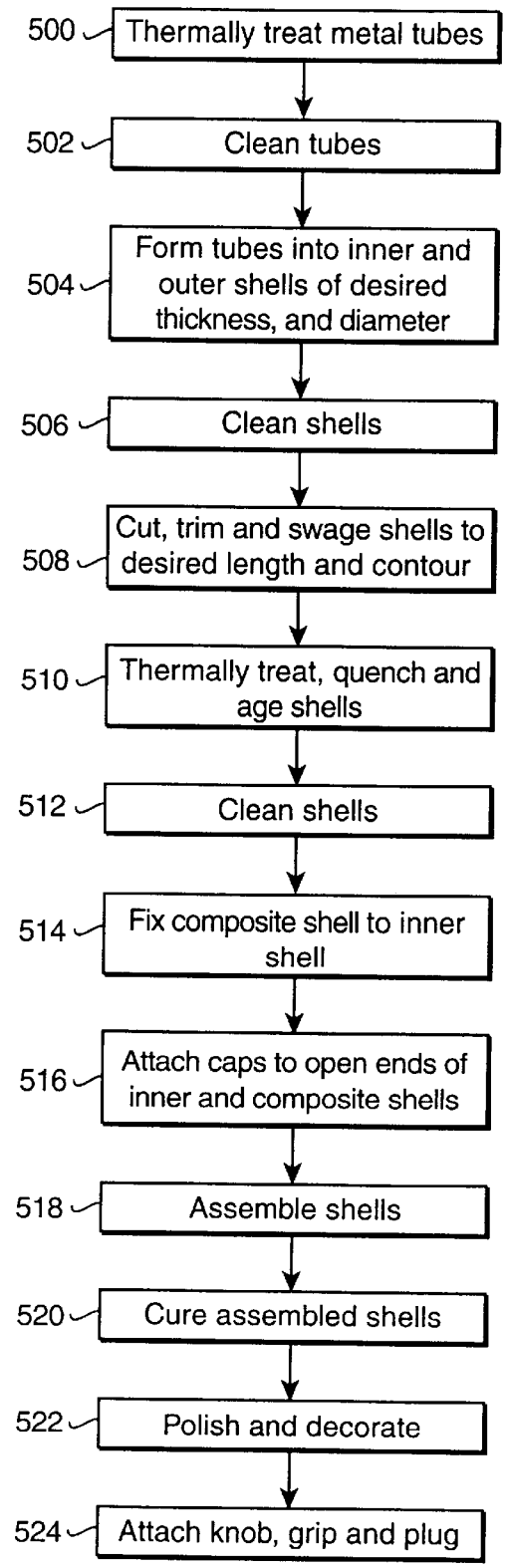
FIG. 5 is a flow chart illustrating the steps taken in manufacturing the bat of the present invention.

With reference to FIG. 5, the metal tubes are first thermally treated (500). This is often referred to in the art as an annealing process. The thermal treatment softens the metal by removing the stress resulting from cold working. This process is to be repeated after a certain amount of cold work has been performed on the metal tubes. Before each cold forming process, the temperature of an anneal oven is set at 410° C. The aluminum tubes are heated in the oven at this temperature for approximately three hours. The oven temperature is then decreased by 20° C. per hour, after the three hour soak time, until the temperature of the tubes has reached 20° C. The aluminum tubes are then heated at a temperature of 230° C. for two hours, at which point the oven temperature is reset to 140° C. The tubes are removed from the oven when the temperature of the oven has reached 140° C.

The tubes are then cleaned (502). During the annealing process, an oxidation scale develops on the surface of the aluminum tubes. An acid cleaning process is required to remove the oxidation scale. The tubes are soaked in a sulfuric acid solution for approximately thirty minutes to remove the oxidation scale each time the tubes are annealed.

The tubes are then formed into inner and outer shells 26 and 12 of desired thickness, contour and length (504). This wall forming process is a cold working process. It is performed to obtain. a wall of a desired thickness. Several cold forming passes may have to be performed depending upon several factors including metal type and the type of bat 10 desired. In the instant example, the tube forming the aluminum outer shell 12 is subject to the cold working process on the outside diameter and the wall thickness sumultaneously to obtain a wall thickness of 0.055 inches with a tolerance of +/−0.003 inches. For the tube forming the aluminum inner shell 26, the same process is followed to obtain an outside diameter of 2.087 inches and wall thickness of 0.035 inches with a tolerance of +/−0.003 inches.

The shells 12 and 26 are then cleaned (506). A degreasing process is required to remove all lubricants and residue substances out of the aluminum shells 12 and 26. This is performed using an ultrasonic method with a detergent agent before and after the aluminum tubes are annealed.

The shells 12 and 26 are then cut, trimmed and swaged to a desired length and contour (508). A thin end of the aluminum outer shell 12 is trimmed to a predetermined length. It is important to have the thin end of the aluminum outer shell 12 squarely trimmed to avoid folding problems when the tubes are swaged by a rotary taper swager. The aluminum outer shell 12 is swaged with a rotary swaging machine to obtain the desired contour shape and wall thickness. In the instant example, the required wall thickness after swaging is 0.055 inches with a tolerance of +/−0.002 inches for the barrel section 16 of the outer shell 12. The required wall thickness for the handle section 14 is 0.085 inches with a tolerance of +/−0.002 inches. The rotary swaging machine also contours the tapered section 18 interconnecting the handle 14 and barrel 16.

A portion of approximately 1.50 to 2.50 inches from an end of the inner tube is swaged with a rotary swaging machine to obtain a desired contoured shape. It is important for the outside diameter of this swaged portion to be slightly larger than the inside diameter of the tapered section 18 of the outer shell 12. This will allow the inner shell 26 to set firmly in its required location when all components are later assembled.

If necessary, after shaping the outer and inner shells 12 and 26 are cut to the desired length. In the instant example, the total required length of the outer shell 12 is 34.5 inches and the weight is 17 ounces. From the end of the barrel 16 to an index is 19.5 inches, and from the index to the open handle end 14 is 15 inches. A portion of approximately 0.50 inches from both ends of the inner shell 26 are rolled inward at a 25° angle so that the inner shell 26 has a length of 16.7 inches and a weight of 10.0 ounces.

The outer and inner shells 12 and 26 are then thermally treated, quenched and aged (510). It is commonly known in the art to expose metal or alloys to a heating and cooling treatment to obtain desired conditions, properties and an increase in strength. The outer and inner aluminum shells 12 and 26 are heat treated to obtain the highest tensile and yield strengths. The required temperature and time for the solution heat treatment is twenty-seven minutes at a temperature of 480° C. After the aluminum shells 12 and 26 are heat treated, they are quenched immediately with either air or water. Quenching is a controlled rapid cooling of a metal from an elevated temperature by contact with a liquid, gas or solid. Precipitation from solid solution results in a change in properties of the alloy, usually occurring rapidly at elevated temperatures. The aluminum shells 12 and 26 are aged in an oven for twelve hours at 135° C.

The shells 12 and 26 are then cleaned again (512). Due to the treatments in step 510, the shells 12 and 26 oxidize. This oxidation is removed by an anodizing process. The outer and inner shells 12 and 26 are anodized for five minutes. To eliminate all possible contaminations, the surfaces of the outer and inner shells 12 and 26 are then thoroughly cleaned with methyl ethyl ketone.

The composite shell 24 is then fixed to the outer surface of the inner shell 26 (514). The composite fiber shell 24 is comprised of layers of glass fiber, carbon fiber, and epoxy resins or other glues and adhesives. Composite fiber layers are wrapped or laminated around the outer surface of the inner shell 26 to form the composite shell 24. This is done by applying an even layer of adhesive on the surface of a composite fiber layer, which is then bonded to outside surface of the inner shell 26. There are various types of glues and adhesives that are commercially available, such as the two-part adhesive (9460A and 9460B) from Dexter. The epoxy resin system can be one of several well known in the art, such as the P-140, 100-S, CAT-S, MEK or equivalent types.

In the preferred embodiment, the first layer comprises a glass fiber layer, wherein the glass fibers are comprised of E glass fibers F 65, strand tensile strength 1400 MPa, or equivalent quality type and grade. The glass fibers are wrapped in a zero degree direction to a total of 100 fiber area weight (FAW). The second layer comprises a carbon fiber wrapped in a direction of forty-five plus degrees to a total of 45 FAW. Preferably, the carbon fiber-type is 12 KF301, grade HTA, strand strength 4236 MPa, strand modulus 239 GPa, elongation 1.78 or equivalent type. A third layer comprises glass fiber wrapped in a direction of forty-five minus degrees to 65 FAW. Another glass fiber layer is wrapped in a 90° direction to 100 FAW. Lastly, a fifth layer comprising glass fiber is wrapped in a 0° direction to 100 FAW. Although the preceding description has been given as a preferred embodiment, it is to be understood that the compositions of the layers and the number of layers can be changed to suit the needs of the resulting bat 10.

A film of polyethylene having a width of approximately 0.80 inches and a thickness of 0.012 inches is wrapped around the composite fiber layers twice to produce an even surface condition for the composite shell 24. The smooth and even surface of the composite shell 24 provides enhanced precision fitting when all shells are assembled together, at which point the polyethylene film is stripped.

After formation of the composite shell 24, caps 30 and 34 are attached to open ends of the inner and composite shells 26 and 24, and the shells 12, 24 and 26 are assembled (516 and 518). To assemble the shells, a thick layer of adhesive is first applied to the surface of the composite shell 24, starting from the smaller end thereof which will enter the open end 38 of the barrel 16 first. A rubber cap 30, preferably comprised of ethylene propylene terpolymer, is squarely placed onto the small open end of the composite and aluminum shells 24 and 26. The small end of the composite and aluminum shells 24 and 26 having the rubber cap 30 is completely inserted into the barrel 16 of the outer shell 12 until the opposite end of the composite and aluminum shells 24 and 26 are located approximately 0.50 to 0.75 inch from the open barrel end 38. Preferably, this operation is performed slowly to assure that there are no voids between the outer shell 12 and the composite shell 24, as the perfect bonding of these three shells 12, 24 and 26 provide superior impact resistance strength. Cap 34 is then mounted into the open end 38 of the barrel 16 at a depth of approximately 0.48 inches. The bat 10 is then hung vertically with the handle 14 facing upward for approximately one hour. The bat 10 is dried for two hours.

The assembled shells 12, 24 and 26 are then cured (520). The curing cycle comprises loading the bat 10 into an oven having a preset temperature of 140° C. After one hour, the oven is shut off. The bat 10 is removed from the oven ten minutes after shutting the oven off. Thereafter, approximately a 0.50 inch portion of the open barreled end 38 is rolled inward at a 90° angle to accommodate the end plug 40. If necessary, the protruded portion of the rolled portion is machined to achieve an opening of 1.25 inches in diameter for installing the end plug 40.

The bat 10 is then polished and decorated (522). Any appropriate methods of polishing and decoration, as are well known in the art, can be applied. In the preferred embodiment, the outer surface of the outer shell 12 is exposed to sodium hydroxide to strip an anodize coating created during the manufacturing process as well as to prepare the outer surface for anodic coating process. Typically, the concentration of the sodium hydroxide is fifty grams per liter. The outer surface of the outer shell 12 is mechanically polished to obtain a mirror finish. The external surface of the outer shell 12 is then anodized. The outer surface of the barrel 16 may be decorated with a graphic by using various methods such as silkscreening, heat transferring, or pad stamping.

The bat 10 is completed by attaching a knob 20, typically by welding a knob comprised of 5000 series or 6000 series aluminum alloy to the open handle end 14 of the bat 10. The grip 22 and the end plug 40 are also installed to finish the bat 10 (524). If desired, the hollow interior of the bat 10 may be filled with foam before the final assembly.

Although constructed from affordable medium to high strength, light weight, and commercially available materials, the reinforced-layer metal bat 10 of the present invention offers the performance and advantages of expensive and high strength materials. The bat 10 provides improved dent resistance. The bat 10 also dampens the hollow and metallic sound created when traditional metal bats hit the ball, and instead imparts a "wood" sound effect due to the composite material sandwiched between the two layers of metal shell. Premature longitudinal cracking of the barrel 16, caused in traditional bats with thin wall thicknesses and high stress conditions, is avoided in the present invention. Although the wall thicknesses of the metal shells 12 and 27 of the preset invention are relatively thin, they are bonded to the composite layer 24 and preferably combined with a resin system in order to create a trampoline effect and a greater hitting zone, commonly referred to as a larger "sweet spot". The use of the rubber caps 30 and 34 installed inside of the barrel 16 at the ends of the composite and aluminum inner shells 24 and 26 serve to damped vibrations that would otherwise sting the hitter's hand when a bat contacts a ball. These caps 30 and 34 have also been found to enhance the "wood" sound feature.

Although an embodiment has been described in detail for purposes of illustration, various modifications may be made without departing from the scope and spirit of the invention. Accordingly, the invention is not to be limited, except as by the appended claims.

What is claimed is:

1. A bat, comprising:
   a metal outer shell having a handle, a barrel of substantially uniform diameter, and an intermediate tapered section interconnecting the barrel and the handle;
   an inner shell comprised of a single inner metal shell having a single composite shell formed over an exterior surface thereof, the inner shell extending substantially the length of the barrel and having a tapered section so as to extend into at least a portion of the intermediate tapered section of the outer shell, wherein the composite shell is adhered to an inner surface of the metal outer shell;
   a first cap having a groove configured to accept at least a portion of a first end of the inner shell therein;
   a second cap having a groove configured to accept at least a portion of the second end of the inner shell therein; and
   an end plug attached to an open end of the barrel opposite the handle.

2. The bat of claim 1, wherein the inner metal shell of the inner shell extends beyond the composite shell for reception in the grooves of the first and second caps.

3. The bat of claim 1, wherein the inner shell extends 1.50 to 2.50 inches into the tapered section of the outer metal shell.

4. The bat of claim 1, wherein an internal end of the end plug extends into the second cap.

5. The bat of claim 1, wherein the inner metal shell is seamless.

6. The bat of claim 1, wherein the end plug includes a circumferential groove configured to receive an inwardly directed end of the barrel therein.

7. The bat of claim 1, wherein the outer and inner shells are comprised of an aluminum alloy.

8. The bat of claim 1, wherein the barrel of the outer shell has a thickness exceeding the thickness of the inner shell.

9. The bat of claim 1, wherein the caps are comprised of an elastomeric material to dampen vibrations and enhance the desired audible sound upon impact.

10. The bat of claim 1, wherein the inner shell extend substantially the length of the barrel of the outer shell.

11. The bat of claim 1, including a resin layer interposed between the composite shell and the barrel of the outer shell.

12. A bat comprising:
    an metal outer shell having a handle, a barrel of substantially uniform diameter, and an intermediate tapered section interconnecting the barrel and the handle;
    an inner shell comprised of a single seamless inner metal shell having a single composite shell formed over an exterior surface thereof such that the inner metal shell extends from ends of the composite shell, the inner shell extending substantially the length of the barrel and having a tapered section so as to extend into at least a portion of the intermediate tapered section of the outer shell, wherein the composite shell is adhered to an inner surface of the metal outer shell;
    a first cap having a groove configured to accept the extended portion of the metal inner shell of a first end of the inner shell therein;
    a second cap having a groove configured to accept the extended portion of the metal inner shell of the second end of the inner shell therein; and
    an end plug attached to an open end of the barrel opposite the handle and having an inner end extending into the second cap;
    wherein the first and second caps are comprised of an elastomeric material to dampen vibrations and enhance an audible wood-like sound upon impact.

13. The bat of claim 12, wherein the inner shell extends 1.50 to 2.50 inches into the tapered section of the outer metal shell.

14. The bat of claim 12, wherein the end plug includes a circumferential groove configured to receive an inwardly directed end of the barrel therein.

15. The bat of claim 12, wherein the barrel of the outer shell has a thickness exceeding the thickness of the inner shell.

16. The bat of claim 12, including a resin layer interposed between the composite shell and the barrel of the outer shell.

17. A method for manufacturing a bat, comprising:
    providing a metal outer shell having a handle, a barrel and an intermediate tapered section interconnecting the barrel and handle;
    providing a metal inner shell;
    fixing a composite fiber shell to an exterior surface of the inner shell;

attaching opposite ends of the metal inner shell to first and second elastomeric caps to reduce vibrations and enhance a desired wood-like audible sound; and placing the composite fiber shell and inner shell within the barrel of the outer shell and adhering the composite fiber shell directly to an inner surface of the metal outer shell to create an effective hitting area producing a desired audible sound when the barrel is struck.

18. The method of claim 17, wherein the fixing step comprises laminating composite fibers over an exterior surface of the inner shell.

19. The method of claim 17, including the step of placing a resin between an inner surface of the barrel of the outer shell and the composite fiber shell.

20. The method of claim 17, including the step of attaching an end plug to an open end of the barrel, wherein an inner end of the end plug extends into the second cap.

21. The method of claim 17, wherein the composite shell and the inner metal shell extend substantially the length of the barrel and at least into a portion of the tapered section of the outer metal shell.

22. The method of claim 21, wherein the composite shell and inner metal shell extend between 1.50 inches and 2.50 inches into the tapered section.

23. The method of claim 17, wherein the providing the outer metal shell step includes the steps of providing an aluminum alloy tube and forming the metal outer shell having the handle, the barrel and the intermediate tapered section.

24. The method of claim 17, wherein the providing the inner metal shell step includes the steps of providing a seamless aluminum alloy tube and forming the inner metal shell having an outer diameter which is less than that of the inner diameter of the barrel and of a thickness which is less than that of the outer shell.

25. The method of claim 17, wherein the fixing step includes fixing multiple layers of composite material and adhesive to the outer surface of the metal inner shell.

26. The method of claim 25, including the steps of wrapping a first glass fiber layer in a zero degree direction, wrapping a second carbon fiber layer in a forty-five plus degree direction, wrapping a third glass fiber layer in a forty-five minus degree direction, wrapping a fourth glass fiber layer in a ninety degree direction, and wrapping a fifth glass fiber layer in a zero degree direction.

* * * * *